G. W. HEATH.
Horse Hay-Fork.
No. 63,244.
Patented March 26, 1867.
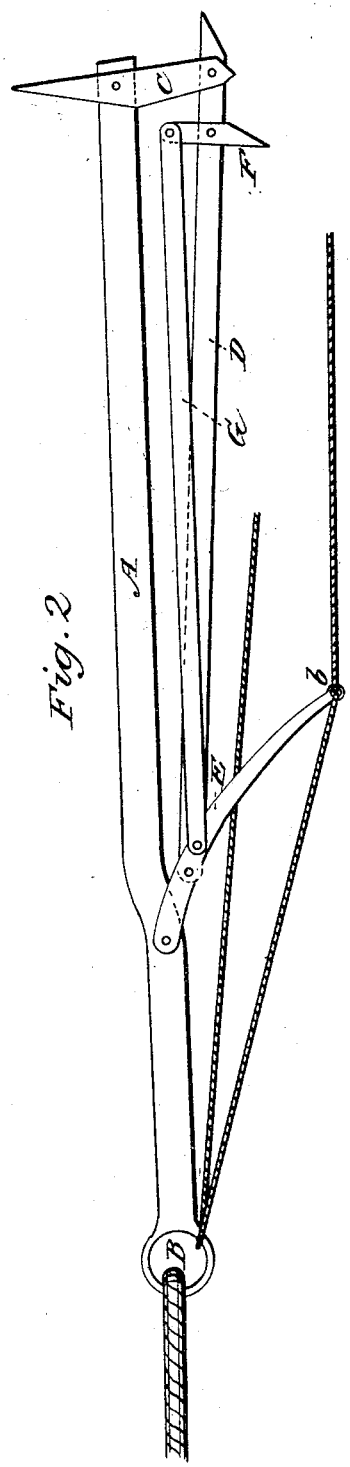
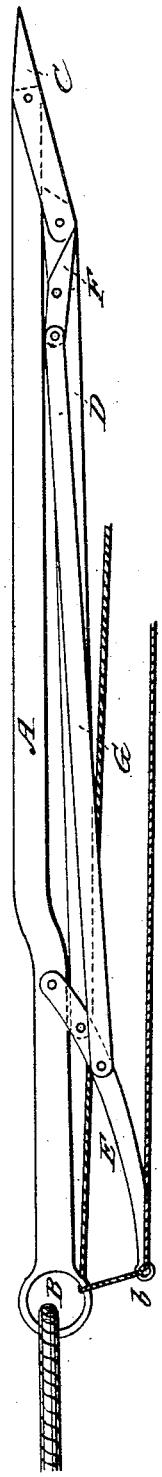
Witnesses:
A. Turner
C. V. Gordon
Inventor:
George W. Heath by
Alidney Drown atty

United States Patent Office.

GEORGE W. HEATH, OF BURLINGTON, PENNSYLVANIA.

Letters Patent No. 63,244, dated March 26, 1867.

---

IMPROVEMENT IN HORSE HAY-FORKS.

---

The Schedule referred to in these Letters Patent and making part of the same.

---

TO ALL WHOM IT MAY CONCERN:

Be it known that I, GEORGE W. HEATH, of Burlington, Bradford county, Pennsylvania, have invented, made, and applied to use, a new and useful Horse Hay-Fork for elevating hay; and I do declare the following to be a full, clear, and correct description of the same, reference being had to the accompanying drawings, making a part of this specification, and to the letters of reference marked thereon, in which—

Figure 1, a view of my improved hay-fork closed and ready for insertion into the hay.

Figure 2, a view of the same open, after its insertion into the hay.

In the drawings like parts of the invention are pointed out by the same letters of reference.

The nature of my invention consists in the construction and operation of a new and improved horse hay-fork, as more fully hereinafter described.

To enable those skilled in the arts to make and use my invention, I will describe the operation and construction of the same. Speaking first of the construction—

A shows the main bar of my improved horse hay-fork, which main bar may be made of any suitable metal, and is provided at its upper end with the eye or bow B, to receive the hoisting tackle. This main bar A is curved at about two-thirds its length, for the purpose of receiving the secondary bar, when the same is thrown out its full length, and to allow the handle to be dropped to its proper position, so that the same shall not come into contact with any obstructions, as well as to bring the rivets, when the fork is opened, in a uniform line with each other, thus preventing the fork from opening until required. At the lower end of this main bar A is pivoted the point or fluke C. D is a secondary bar, made about two-thirds the length of the main bar A, the lower end of which bar D is pivoted to the rear end of the point or fluke C, while its upper end is attached to the curved handle E. F is a second point or fluke made smaller than the point or fluke C, and pivoted at its centre to the secondary bar D, a little above the point at which the point or fluke C is attached to the bar A. E shows a curved handle by which the fork is operated; this handle is pivoted at one end to the main bar A, and has pivoted to it the upper end of the secondary bar D. This curved handle, at its opposite end is provided with the eye or bow b to receive the tripping tackle, by operating which it is intended that the fork shall be released from the hay after the same has been elevated. G is a third bar, made smaller than the bars A and D; this third bar G has one end pivoted to the back end of the point or fluke F, while its opposite end is pivoted to the curved handle E, a short distance outside of the point of pivoting the bar D.

My improved horse hay-fork being thus constructed, the operation is as follows: The fork, as shown in fig. 1, is closed, the point or fluke projecting in a line parallel with the main bar A. In this position it is inserted into the body of hay to be elevated. After the same has been inserted into the hay to be elevated, the rope attached to the eye or bow b is pulled downward sufficiently to depress this curved handle. As this curved handle is depressed, the secondary bar is thrown downward, and as this operation of the secondary bar is effected, the point or fluke C, pivoted, as shown, to the main bar A, and secondary bar D, is thrown outward at a right angle from the bar A. Simultaneously with the depression of the curved handle and throwing out of the point or fluke, the third bar is depressed, by which depression the point or fluke attached to the third bar is thrown outward at a right angle from the bar D. It will be observed that as the curved handle is depressed, the bar D is moved outward at its lower end from the main bar A, the effect of which is to spread or strain the hay outward, serving to give the flukes or points a strong hold in the hay. The operating parts of the fork having been thus firmly inserted in the hay, the same is raised by a rope attached to the eye B of the main bar A, which rope passes over a pulley and is drawn by a horse. When the fork, carrying with it the hay, has been elevated the proper distance, and it is desired to release the hay from the fork, the rope passing from the eye or bow of the curved handle, as well as through the eye upon the main bar, is pulled so as to elevate and bring back to its original position the curved handle. As this handle returns, it operates the secondary and third bars, bringing them back to their former position, and as they return thereto the points or flukes, thrown out by the depression of these bars, return to their former position, pointing downward, and the fork may then be readily withdrawn from the elevated hay, discharging the same.

Having thus described my invention, what I claim as new, and desire to secure by Letters Patent, is—

In combination with the bars A D and G, I claim the curved handle E, and points or flukes C and F, when the same shall be constructed and operated substantially as shown.

GEORGE W. HEATH.

Witnesses:
A. SIDNEY DOANE,
I. POUGE.